June 20, 1950   E. L. MIDGETTE ET AL   2,511,935
TRAVELING GRATE STOKER INCLUDING
GRATE BAR RETAINING MEANS
Filed Jan. 31, 1946   6 Sheets-Sheet 1
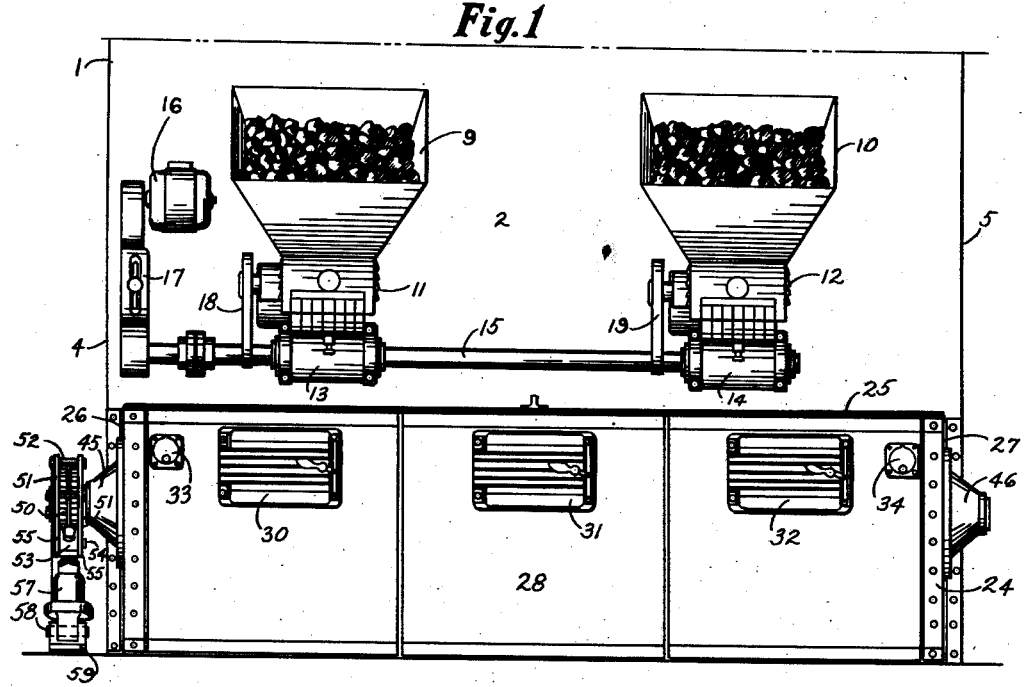
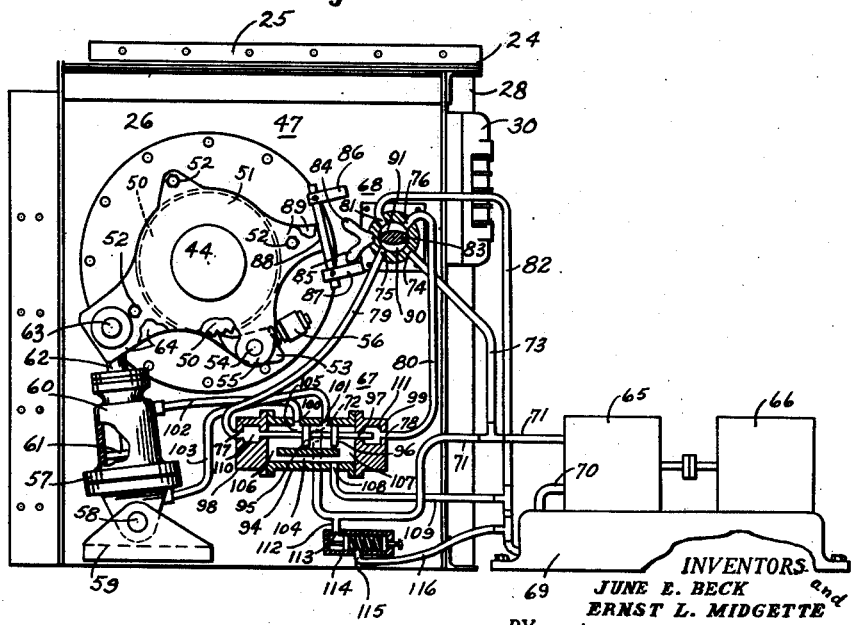
INVENTORS
JUNE E. BECK and
ERNST L. MIDGETTE
BY
Attorney

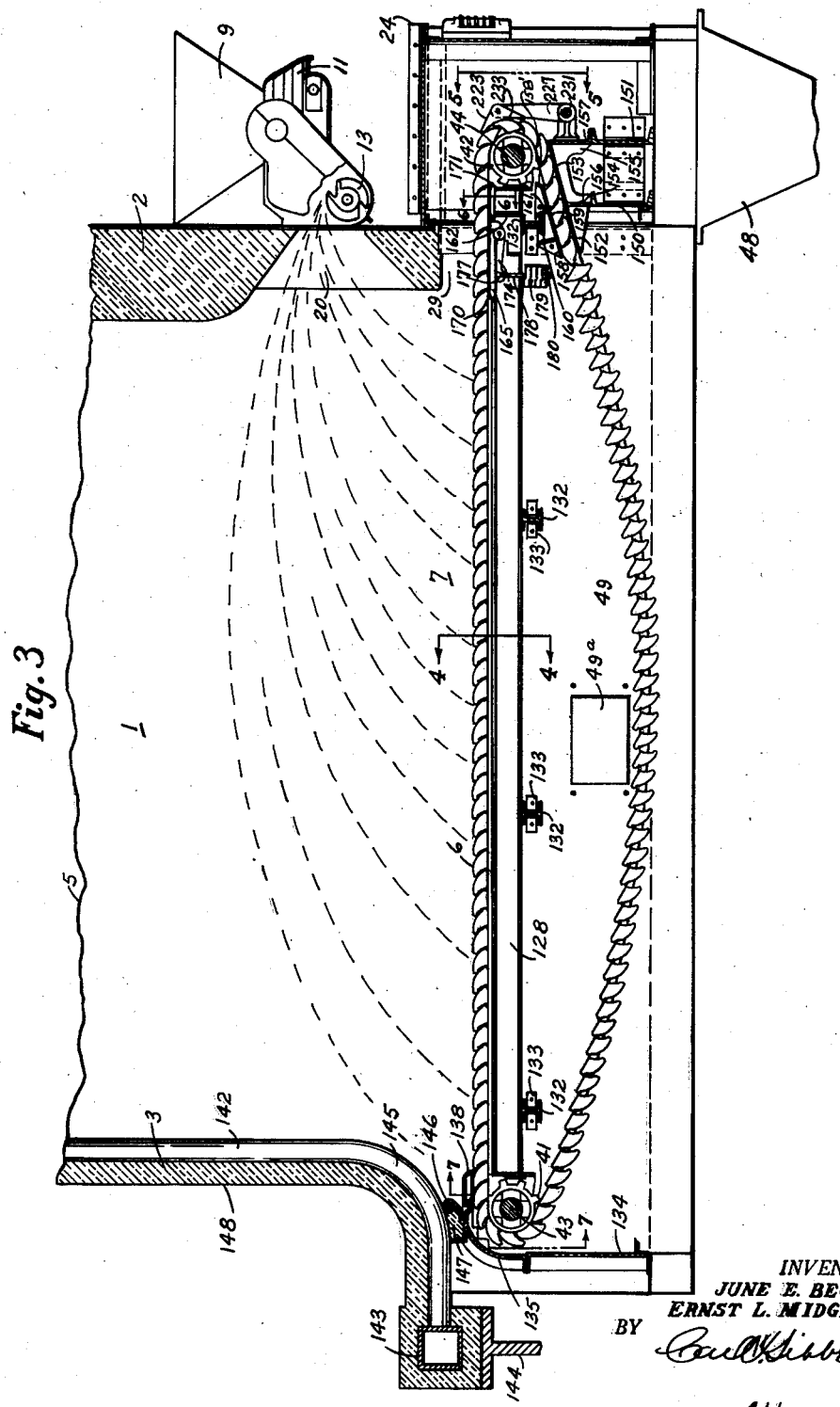

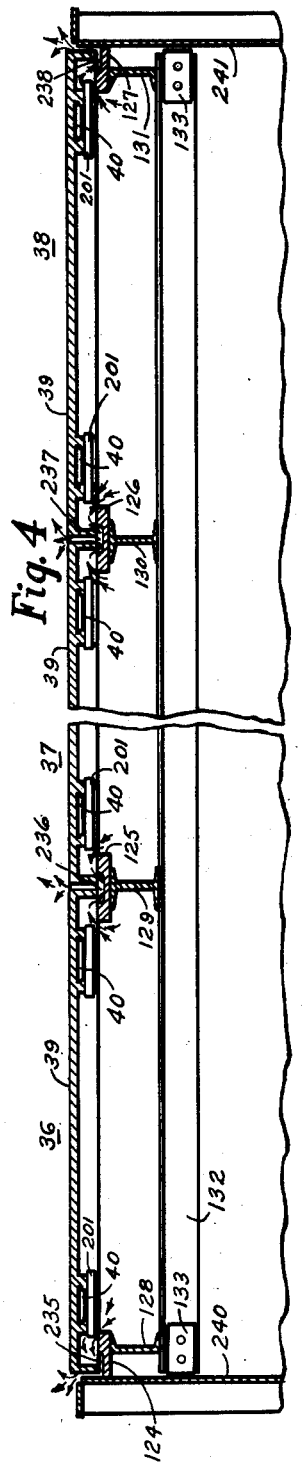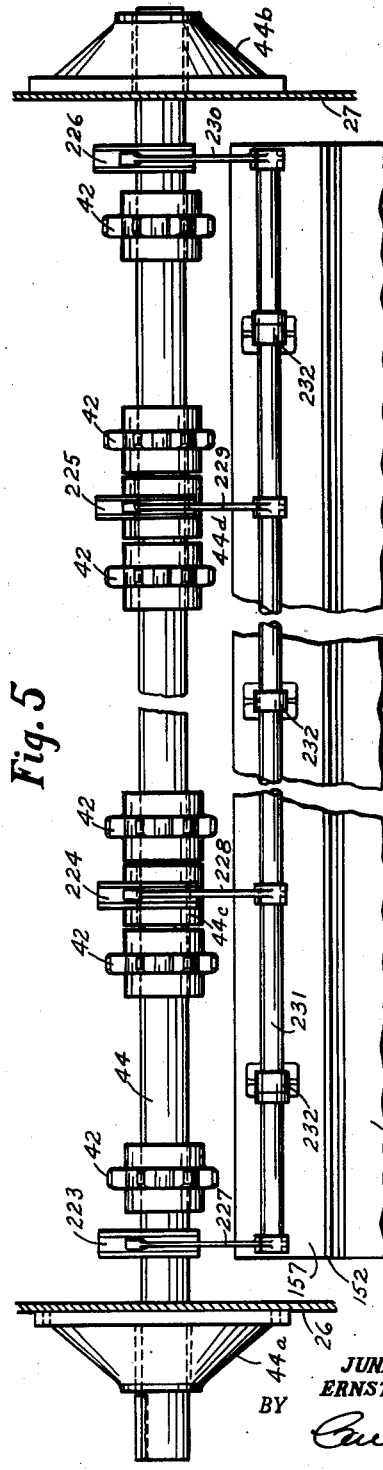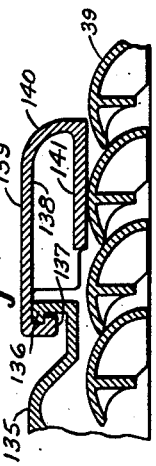
INVENTORS.
JUNE E. BECK
ERNST L. MIDGETTE
BY
Attorney June 20, 1950
E. L. MIDGETTE ET AL
TRAVELING GRATE STOKER INCLUDING
GRATE BAR RETAINING MEANS
Filed Jan. 31, 1946
2,511,935
6 Sheets-Sheet 4
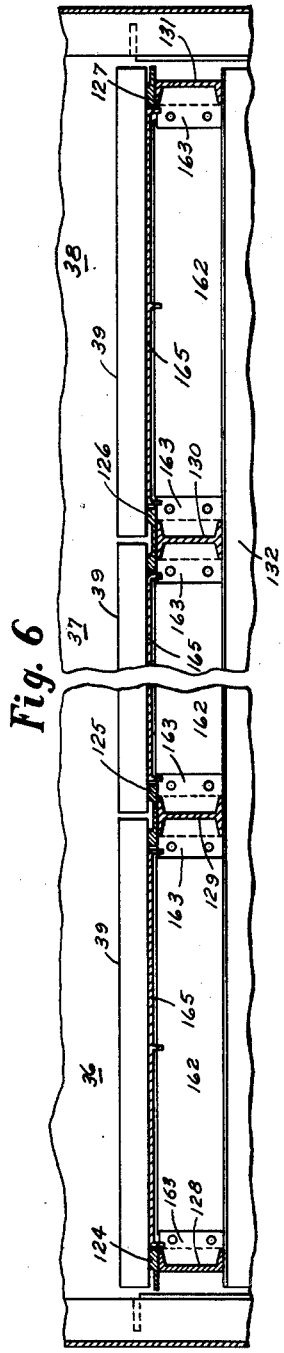
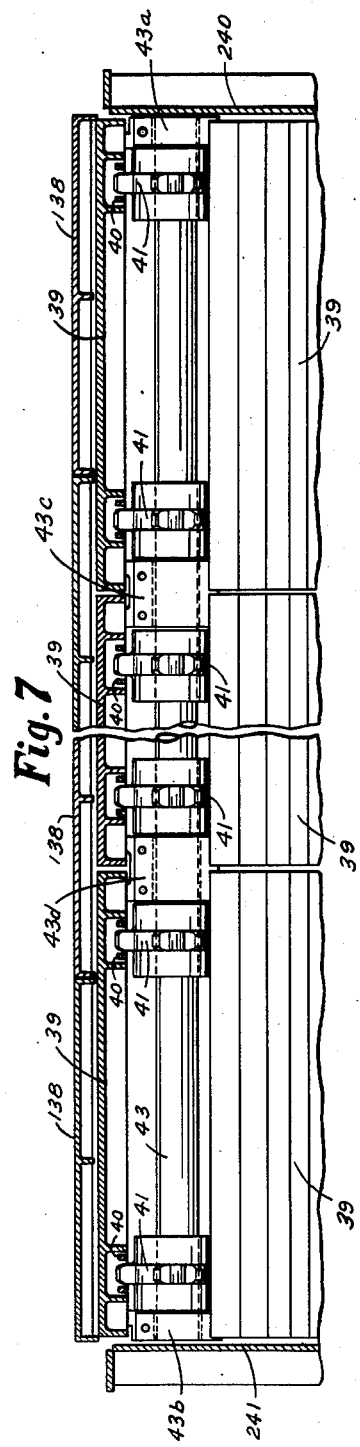
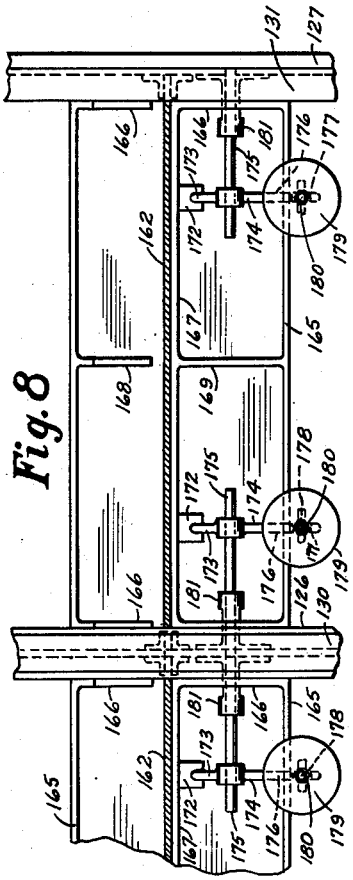
INVENTORS.
JUNE E. BECK and
ERNST L. MIDGETTE
BY
Attorney

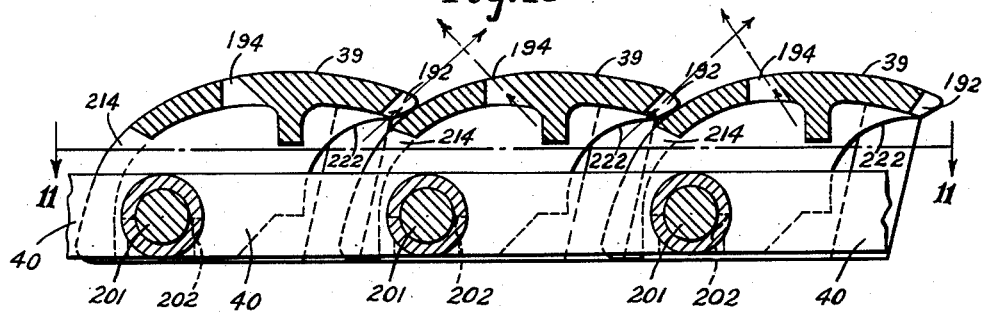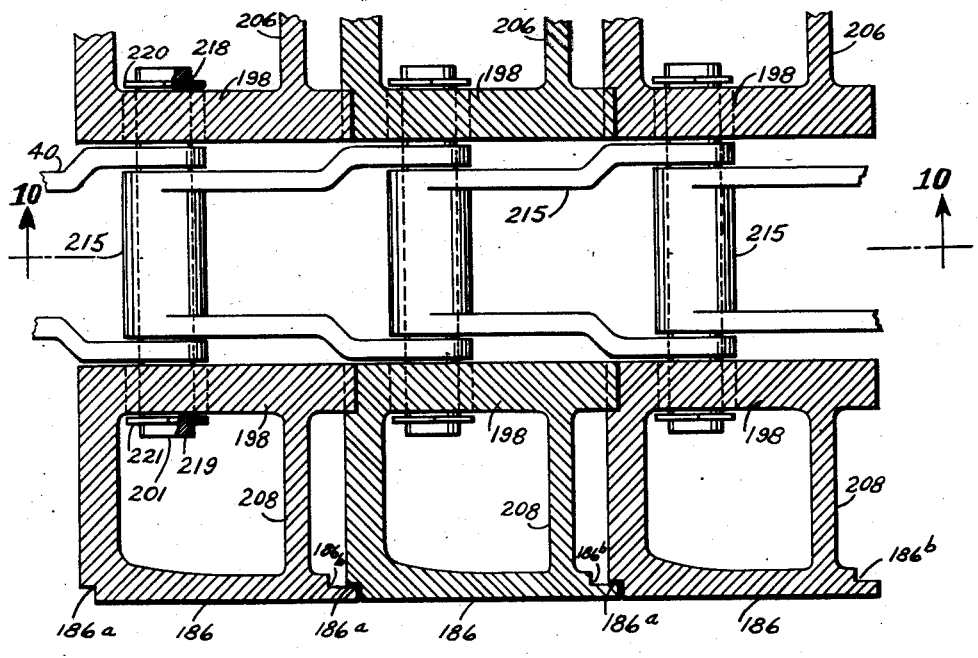

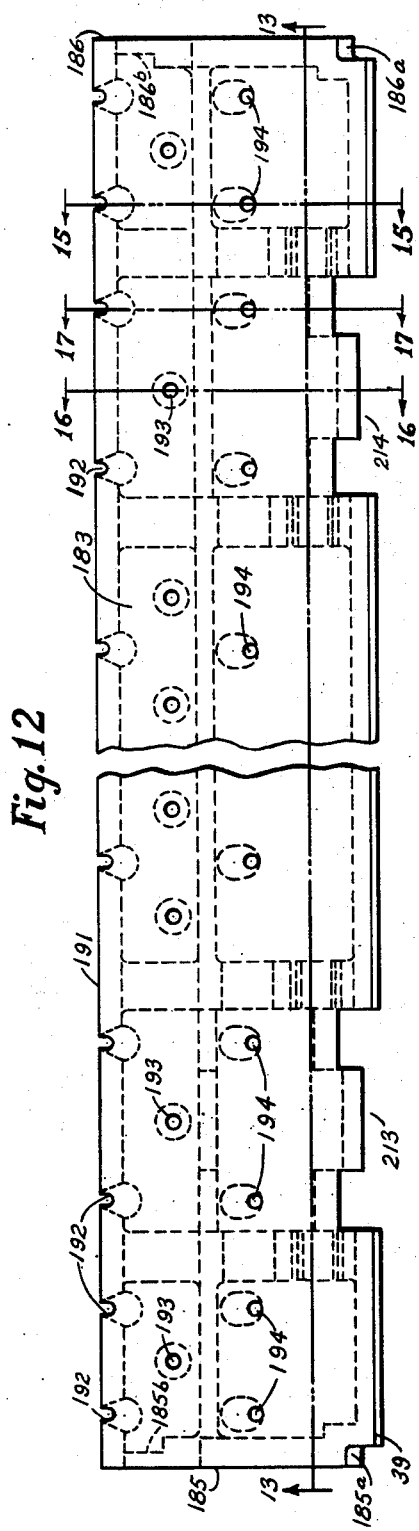
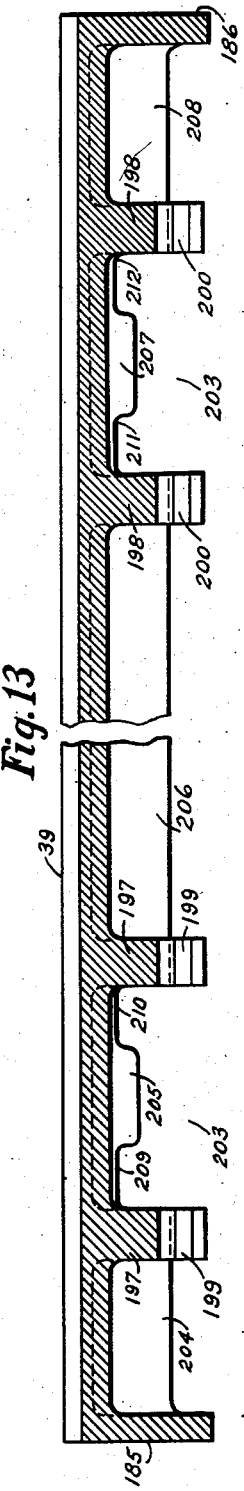
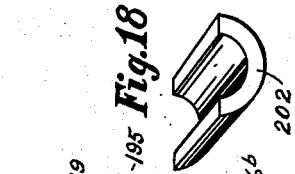
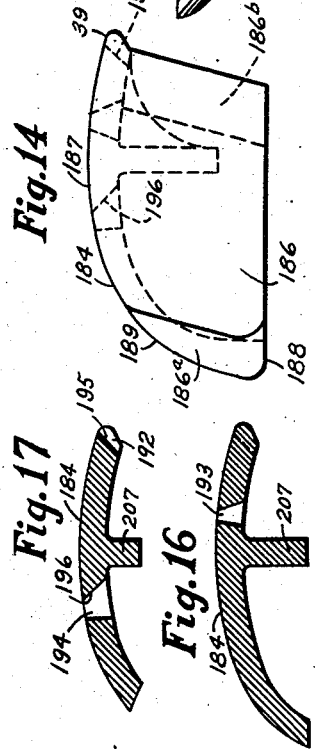
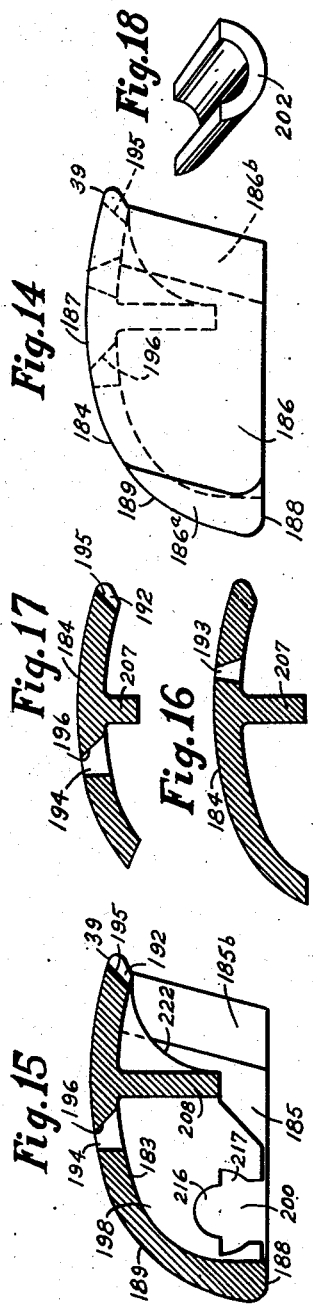
INVENTORS.
JUNE E. BECK and
ERNST L. MIDGETTE
BY
Attorney Patented June 20, 1950

2,511,935

UNITED STATES PATENT OFFICE 2,511,935

TRAVELING GRATE STOKER, INCLUDING GRATE BAR RETAINING MEANS

Ernst L. Midgette, Philadelphia, Pa., and June E. Beck, Lyndhurst, N. J., assignors to American Engineering Company, Philadelphia, Pa., a corporation of Pennsylvania Application January 31, 1946, Serial No. 644,580

3 Claims. (Cl. 110—40)

This invention relates to stokers, and more particularly to traveling grate stokers employed in spreader type furnaces.

One object of the present invention is to provide a simplified and generally improved stoker of the traveling grate type.

Another object is to provide a simplified and highly improved operating mechanism for the traveling grates of stokers of the character described.

A still further object is to provide in traveling grate stokers improved means for preventing separation of the grate bars as they pass over one of the sprocket wheels or drums.

Other and further objects will become apparent as the description of the invention progresses.

Of the drawings:

Fig. 1 is a front elevational view of the furnace comprising the present invention, showing the fuel hoppers, the fuel conveying and feeding mechanism, and the operating mechanism for the grate associated therewith.

Fig. 2 is a side elevational view, diagrammatic in part, of the operating mechanism for the grate, certain of the elements of which are shown in section to illustrate the principle of operation thereof.

Fig. 3 is a longitudinal sectional view taken throughout the furnace showing the stoker and the fuel feeding mechanism associated therewith.

Fig. 4 is a sectional view taken substantially along line 4—4 of Fig. 3.

Fig. 5 is an end elevational view taken substantially along line 5—5 of Fig. 3.

Fig. 6 is a sectional view taken substantially along line 6—6 of Fig. 3.

Fig. 7 is an end view, partly in section, taken substantially along line 7—7 of Fig. 3, some of the grate bars having been removed to show the structure of the sprocket wheels and shaft.

Fig. 8 is a view of the undersides of the upper sealing plates provided near the front end of the stoker showing the mechanism for holding them in operative position.

Fig. 9 is an enlarged fragmentary sectional view of the sealing means provided at the rearwardly disposed end of the stoker and of the grate bars adjacent thereto.

Fig. 10 is a sectional view taken on the line 10—10, Fig. 11.

Fig. 11 is a sectional plan view taken substantially along line 11—11 of Fig. 10.

Fig. 12 is a plan view of one of the grate bars of the traveling grate.

Fig. 13 is a sectional view of the grate bar shown in Fig. 12, taken substantially along line 13—13 of Fig. 12.

Fig. 14 is an end view of the grate bar shown in Fig. 12.

Fig. 15 is a sectional view of the grate bar taken substantially along line 15—15 of Fig. 12.

Fig. 16 is a sectional view taken substantially along line 16—16 of Fig. 12.

Fig. 17 is a sectional view taken substantially along line 17—17 of Fig. 12; and Fig. 18 is a perspective view of a segmental sleeve for retaining the grate bars in position on their respective pins.

Referring to the drawings, the numeral 1 indicates generally a furnace having front and rear walls 2 and 3, respectively, and side walls 4 and 5. The grate 6 of a stoker 7 of the traveling grate type is mounted in the furnace 1 and forms the bottom wall thereof. Mounted at spaced points on the outer surface of front wall 2 are a pair of coal hoppers 9 and 10. Fuel from hoppers 9 and 10 gravitates onto traveling conveyors 11 and 12, respectively, which in turn convey the said fuel to feeding and spreading rotors 13 and 14. The rotors 13 and 14 are secured to a shaft 15 and are driven by an electric motor 16 through any suitable variable speed transmission indicated generally at 17. The fuel conveyors 11 and 12 are operatively connected to shaft 15 by belt and pulley connections 18 and 19, respectively. The fuel conveyors 11 and 12 and the rotors 13 and 14 may be of any suitable construction, and since the specific structure thereof forms no part of the present invention a detailed description of these devices will not be given. For a full disclosure of such fuel conveyors reference may be had to the United States patent to George W. Olney, No. 2,099,618, granted on November 16, 1937. For a full disclosure of rotors of the type shown herein reference may be had to the pending application of Ernst L. Midgette and Robert W. Reid, Serial No. 599,812, filed on June 16, 1945.

As shown more particularly in Fig. 3, fuel from conveyor 11 is delivered to rotor 13 which in turn feeds it through an opening 20 provided in front wall 2 and distributes it over substantially one-half the area of grate 6. The fuel conveyor 12 similarly conveys the fuel from hopper 10 to the rotor 14 which in turn feeds it through a similar opening (not shown) in front wall 2 and distributes the fuel over the other half of grate 6. A furnace having but two feeding and distributing rotors is shown simply for the purpose of illustration, it being apparent that a greater or lesser number of rotors and associated parts may be employed without departing from the invention.

The front end of the grate 6 extends into an ash receiving extension 24 of the furnace, comprising a metallic enclosure having a top wall 25, end walls 26 and 27, and a front wall 28.

The lower end of front wall 2 terminates a short distance above the grate 6, thereby providing a space 29 therebetween which extends across the entire width of the furnace. The front wall 28 of extension 24 has provided therein three spaced rectangular openings in substantial alignment with the space 29 between the grate 6 and the lower end of front wall 2. These openings are normally closed by hinged furnace doors 30, 31 and 32, respectively. Normally closed observation openings 33 and 34 are also provided, respectively, at the opposite ends of front wall 28 in substantial alignment with the space 29 above the grate 6. Access to the stoker may, accordingly, be had to remove clinkers or ashes from the grate or to correct any condition in the fuel bed that may require attention.

As shown more particularly in Fig. 4, the grate 6 is comprised of three sections 36, 37 and 38 disposed transversely of the stoker. It is apparent, however, that a greater or lesser number of sections may be provided, depending upon the width of the furnace, without departing from the invention. Each of the grate sections 36, 37 and 38, as shown more particularly in Figs. 3 and 6, comprises a series of overlapping grate bars 39. The grate bars 39 of each section are, as hereinafter more fully described, pivotally attached at widely spaced points to a pair of chains 40, 40. The chains 40, 40 for each section are trained over a pair of rear sprocket wheels 41, 41 and a corresponding pair of front sprocket wheels 42, 42. The sprocket wheels 41 for all the sections are secured to a shaft 43 mounted in suitable bearings 43$^a$ and 43$^b$ provided in the closing plates 240 and 241 disposed adjacent side walls 4 and 5, respectively, of the furnace. Intermediate bearings 43$^c$ and 43$^d$ secured to the rearwardly disposed ends of beams 130 and 129, respectively, are also provided for shaft 43. The sprocket wheels 42 for all the sections are similarly secured to a shaft 44 mounted in bearings 44$^a$ and 44$^b$ provided respectively in the side walls 26 and 27 of extension 24. Intermediate bearings 44$^c$ and 44$^d$ secured to the front ends of beams 129 and 130, respectively, are also provided for shaft 44.

Shaft 44 is driven by an operating mechanism indicated generally at 47, and through the connections just described operates the grate 6 from rear to front of the furnace. A considerable portion of the fuel fed to the furnace by the rotors 13 and 14 is burned in suspension. The remainder of the fuel is burned on the grate 6 as it travels toward the front of the furnace. The ashes are dumped over the front end of the grate 6 as the grate bars 39 thereof pass around the front sprockets 42 and gravitate into an ash hopper 48 disposed beneath the extension 24, from which they may be removed from time to time by any suitable means. Air under pressure is supplied to the chamber 49 beneath the grate 6 through an opening 49$^a$ provided in side wall 5 and side closing plate 241 by any suitable fan or blower mechanism (not shown).

Referring to Figs. 1 and 2, the operating mechanism 47 for the grate 6 comprises a ratchet wheel 50 secured to the outer end of shaft 44 adjacent bearing 45. Loosely mounted on shaft 44 and disposed at either side of ratchet wheel 50 are a pair of multi-armed operating plates 51, 51. Plates 51, 51 are held in spaced relation in any suitable manner, such as by shouldered bolts 52. A pawl 53 pivotally mounted on a pin 54 secured in aligned apertures provided in the arms 55, 55 of plates 51, 51 engages the ratchet wheel 50. Pawl 53 has a weight 56 adjustably secured thereto for holding it in engagement with the ratchet wheel when the plates 51, 51 are moved in one direction and for allowing the pawl to ride over the teeth of the ratchet wheel when the plates 51, 51 are moved in the opposite direction.

The plates 51, 51 are oscillated, in the embodiment illustrated, by means of a fluid motor 57 pivotally supported on a pin 58 mounted at the upper end of a bracket 59 which in turn is secured to the floor of the boiler room, in any suitable manner. Fluid motor 57 comprises a casing 60 having a piston 61 operating therein. The upper end of the piston rod 62 secured to piston 61 is pivotally attached to a pin 63 secured in aligned apertures provided in the arms 64, 64 of plates 51, 51. Thus upon movement of the piston 61 upwardly, a clockwise movement is imparted to plates 51, 51, causing the pawl 53 to actuate the ratchet wheel 50, and, consequently, the shaft 44 in a clockwise direction and thereby effecting a movement of the upper run of the grate 6 toward the front of the furnace. Upon a downward movement of the piston 61 the plates 51, 51 are moved in a counter-clockwise direction during which time the pawl 53 simply rides over the teeth of ratchet wheel 50 and, consequently, no retrograde movement is imparted to the said ratchet wheel or to the grate 6.

Fluid motor 57 is operated by a pump 65 driven by an electric motor 66. Pump 65 may be of any suitable type, such for example as a variable discharge, radial piston type of pump, shown and described in the United States patent to Henry S. Hele-Shaw and Francis L. Martineau, No. 1,077,979, granted on November 11, 1913, and to which reference may be had for a full disclosure thereof. The direction of operation of fluid motor 57 is controlled by a four-way control valve 67, which in turn is controlled by a trip valve 68. Valves 67 and 68 may be secured to the end wall 26 of extension 64 by bolts or by any other suitable securing means.

During operation thereof fluid from a makeup tank 69 is drawn into pump 65 through a pipe 70 and is discharged therefrom through a pipe 71. Pipe 71 is connected to the inlet port 72 of valve 67 and by a branch pipe 73 to the inlet port 74 of valve 68. The outlet ports 75 and 76 of valve 68 are connected to the ports 77 and 78, respectively, provided at the opposite ends of valve 67 by pipes 79 and 80. A fourth port 81 of valve 68 is connected to makeup tank 69 by a pipe 82. A rotatable valve element 83 is provided in the casing of valve 68 and has secured thereto a pair of laterally extending lugs 84 and 85 adapted to be engaged by dogs 86 and 87, respectively adjustably mounted on a bar 88 which in turn is secured to the arms 89, 89 of plates 51, 51. Valve element 83 has a slot or passage 90 provided around a portion of the periphery thereof which, when the valve element is rocked in a clockwise direction by engagement of lug 85 by dog 87, connects ports 75 with port 74, thereby causing fluid from pump 65 to enter the port 77 of valve 67 through pipe 79. When valve element 83 is rocked in a counterclockwise direction by engagement of lug 84 by dog 86, port 76 is connected to inlet port 74, thereby causing fluid from pump 65 to enter port 78 of valve 67 through pipe 80. Valve element 83 has an additional port or passage 91 provided therein which is adapted to connect port 75 with exhaust port 81 when passage 90 connects ports 74 and 76 to pressure, and to connect port 76 to exhaust port 81 when passage 90 connects ports 74 and 75 to pressure.

Valve 67 comprises a cylindrical casing 94 having a pair of spaced valve elements 95 and 96 mounted in the cylindrical interior 105 thereof. Valve elements 95 and 96 are secured in spaced relation on a stem 97, the opposite ends of which extend through aligned apertures provided in the end plates 98 and 99 of valve 67. Valve elements 95 and 96 normally close a pair of ports 100 and 101 provided at the upper end of the casing 94. Port 100 is connected to the upper end of the cylinder 60 of fluid motor 57 by means of a pipe 102. Port 101, on the other hand, is connected to the lower end of cylinder 60 of motor 57 by means of a pipe 103. Casing 94 is provided with a passage 104 at the lower end thereof which is connected to the opposite ends of cylindrical chamber 105 by ports 106 and 107. A port 108 is provided at the lower end of casing 94 and extends from the outer wall thereof to passage 104. A pipe 109 connects port 108 to drain pipe 82 which in turn is connected to make up tank 69. End plates 98 and 99 have enlarged cylinders 110 and 111, respectively, provided therein which communicate with the ports 77 and 78, respectively, provided at the outer ends thereof.

As shown in Fig. 2, a branch pipe 112 connects pipe 71 with the inlet port 113 of an adjustable relief valve 114. Relief valve 114 is of usual construction and the discharge port 115 thereof is connected to drain pipe 82 by a pipe 116.

From the foregoing description it is seen that when the parts are in the position shown in Fig. 2 dog 87 has engaged lug 85 of valve 68, causing shifting of the valve element 83 thereof so as to cause fluid from pump 65 to enter port 77 of valve 67 through pipes 71 and 73, port 74, passage 90, port 75, and pipe 79. The fluid pressure acting on the end of valve stem 97 causes movement of the latter and, consequently, of valve elements 95 and 96 to the right, thereby connecting the chamber 105 of casing 94 with port 101. Fluid from pump 65 now flows through pipe 71, inlet port 72, port 101 and then to the lower end of cylinder 60 of fluid motor 57 through pipe 103 to cause the piston 61 to move upwardly. Upon movement of valve elements 95 and 96 to the right, as aforesaid, the fluid in chamber 111 displaced by the end of connecting rod 97 flows to makeup tank 69 through port 78, pipe 80, port 76 of valve 68, passage 91, port 81 and pipe 82. It is also seen that as piston 61 moves upwardly the fluid at the upper end of cylinder 60 of fluid motor 57 will flow to makeup tank 69 through pipe 102, port 100, chamber 105, port 106, passage 104, port 108, pipe 109, and drain pipe 82. Upon movement of piston 61 of fluid motor 57 upwardly the operating plates 51, 51 are moved in a clockwise direction, thereby causing the pawl 53 carried thereby to operate the ratchet wheel 50 in a clockwise direction to effect a movement of grate 6 of stoker 7 toward the front of the stoker.

As plates 51, 51 approach the limit of their travel dog 86 engages lug 84 of valve 68, causing movement of the valve element 83 thereof in a counter-clockwise direction, thereby causing passage 90 to connect ports 74 and 76 to pressure and passage 91 to connect ports 75 and 81 to exhaust. Fluid from pump 65 now enters port 78 of valve 67 through pipes 71 and 73, port 74, passage 90, port 76 and pipe 80, causing shifting of the valve elements 95 and 96 to the left and thereby connecting port 100 with the interior of chamber 105. The fluid displaced by the end of valve stem 97 in cylinder 110 flows to exhaust through port 77, pipe 79, port 75, passage 91, port 81 and drain pipe 82. Fluid from pump 65 now flows to the upper end of cylinder 60 of fluid motor 57 through pipe 71, port 72, port 100 and pipe 102, thereby causing piston 61 to move downwardly. Fluid at the lower end of cylinder 60 now flows to makeup tank 69 through pipe 103, port 101, chamber 105, port 107, passage 104, port 108, pipe 109 and drain pipe 82. When the piston 61 approaches its lower limit of travel, dog 87 will again engage lug 85 to shift valve elements 83 to the position shown in Fig. 2, thereby effecting a reversal of flow of fluid to motor 57 and again causing the piston 61 operating therein to move upwardly, as previously described. In this manner the upper run of grate 6 is caused to move by increments toward the front of the stoker. The stroke of the piston 61 may be varied by adjusting the dogs 86 and 87 on rod 88. To reduce the stroke, the dogs are brought toward each other; and vice versa, to increase the stroke, the dogs are moved away from each other.

The speed of operation of motor 57 and, consequently, of the grate 6 may be varied by simply varying the volumetric discharge of pump 65 in a well-known manner.

Referring more particularly to Figs. 1 and 4, it will be observed that the grate bars 39 of the sections 36, 37 and 38 are slidably supported upon skid plates 124, 125, 126 and 127 which are secured in any suitable manner to supporting beams 128, 129, 130 and 131, respectively. Skid plates 124, 125, 126 and 127 and their supporting beams 128, 129, 130 and 131 extend substantially the entire distance between front and rear sprockets 42 and 41, respectively, and in turn are supported upon a series of transverse beams 132 mounted on any suitable supports 133 provided on the side closing plates 240 and 241.

The chamber 49 beneath the stoker is closed at the rearwardly disposed end thereof by means of a closing plate 134 extending transversely of the stoker between side closing plates 240 and 241. A curved plate 135 is secured to the upper edge of closing plate 134 and extends around a portion of the rearwardly disposed end of the grate 6, as shown in Fig. 1. The plates 134 and 135 may be made up in sections, if it is so desired. The front end of plate 135 is formed with a rearwardly extending tongue 136 which, as shown more clearly in Fig. 9, engages a corresponding forwardly extending tongue 137 formed at the rearwardly disposed ends of the rear sealing plates 138. The sealing plates 138 are disposed in end to end relation across the stoker, and each consists of a flat upper portion 139 which terminates in a downwardly curved portion 140 at the front end thereof and a flat rearwardly extending portion 141. In order to assemble the sealing plates 138 on the stoker, the tongues 136 and 137 are simply interlocked and the plates then assume the position shown in Figs. 1 and 9, with the flat portions 141 thereof resting upon the grate bars 39. Inasmuch as the grate bars 39 move toward the front of the stoker during operation thereof, the sealing plates 138 also tend to move in that direction, thereby maintaining the interlocking engagement of the plates 135 and 138.

The rear wall 3 has mounted in cooling relation therewith a series of fluid conducting tubes 142. These tubes are secured at their lower ends in a transverse header 143 mounted on a supporting beam 144 spaced a short distance to the rear of the stoker 7. The tubes 142 extend forwardly, as shown at 145, and overlie the plates 135 and 138 and are then bent upwardly, as shown at 145, and form the exposed portion of the rear wall 3 of the furnace. As shown in Fig. 1, a sealing plate 146 pivotally attached to the lower ends of the tubes 142 rests upon the upper surface of plate 135. The sealing plate 146 may be made up in sections or several plates disposed in end to end relation and may be employed if it is so desired. Heat resistive packing material 147 may be placed between the lower portions of the tubes 142 and the upper surface of plate 135 and in contact with plate 146 to prevent the escape of gases from the furnace. Suitable heat resistive packing material 148 may also be placed at the rearwardly disposed sides of the tubes 142 and around the header 143 to further seal the wall against the leakage of furnace gases.

Mounted transversely of the stoker 7 and disposed in spaced relation near the rearwardly disposed end of the ash receiving extension 24 are a pair of channel beams 150 and 151. A skid ramp 152 for the grate 6 is secured to the upper flanges of beams 150 and 151 and comprises an upper flat inclined portion 153, a pair of spaced supporting legs 154 and 155, and spaced transverse webs 156 and 157.

As shown in Fig. 1, the legs 154 and 155 are supported upon the beams 150 and 151, and the webs 156 and 157 form extensions of the said beams 150 and 151 and in effect provide seals to prevent the leakage of air from the chamber 49. The skid ramp 152 may extend across the entire width of the stoker or it may be made up in sections disposed in end to end relation, as desired. Spaced upwardly from the skid ramp 152 is a sealing plate 158. Sealing plate 158 comprises an inclined substantially flat lower portion 159 disposed in substantially parallel relation with the inclined upper portion 153 of skid ramp 152 and a pair of slightly inclined vertically extending webs 160 and 161. Sealing plate 159 is not positively secured to the framework but simply floats upon the grate bars disposed therebeneath. The webs 160 and 161 overlap the sides of the lower flange of supporting beam 132, the web 161 during operating periods lying in abutting relation with said flange and forming therewith a seal to prevent the escape of air between the portion of the grate disposed between the ramp 152 and sealing plate 158 and the upper flange of the forwardly disposed supporting beam 132. The forward edge 158' of plate 158 is rounded, as shown in Fig. 3, to prevent interference with the grate bars 39 as they pass between the said plate 158 and skid ramp 152.

Extending forwardly from the forward edge of the upper flange of the forwardly disposed supporting beam 132 are a series of sealing plates 162. These plates, as shown more particularly in Fig. 6, extend between and are secured in any suitable manner, such as by bolts, to supporting brackets 163 extending laterally of beams 128, 129, 130 and 131.

Extending between the side edges of each pair of skid plates 124, 125, 126 and 127, near the forward ends thereof and in engagement with the undersides of the grate bars 39 of each of the sections 36, 37 and 38, is an upper sealing plate 165. Each sealing plate 165, as shown more particularly in Figs. 3, 6 and 8, is of substantially rectangular construction and has a downwardly extending flange 166 provided at either side thereof which in assembly lie in substantially abutting relation with the side edges of associated skid plates. A transverse rib or web 167 depends from the underside of each plate 165 intermediate the front and rear edges thereof which in assembly overlaps and lies in juxtaposition with the rearwardly disposed side of the associated vertical sealing plate 162. Reenforcing ribs 168 and 169 are also provided on the underside of each sealing plate 165. To prevent interference with the grate bars 39 during operation of the latter, each sealing plate is bent downwardly at the front and rear edges thereof, as shown at 170 and 171, respectively, in Fig. 3. As shown more particularly in Fig. 8, the underside of each sealing plate 165 is provided with a pair of spaced flat bearing surfaces 172, 172. In assembly each bearing surface 172 is engaged by one end 173 of an associated lever 174 pivotally mounted on a rod 175. The other end 176 of each lever 174 is provided with a notch or hook 177 for receiving a ring provided at the upper end of a weight supporting rod 178. A series of weights 179 are mounted on each rod 178 and are held thereon by a nut 180 engaging the lower threaded end of said rod. The rods 175 are supported in any suitable bearing brackets 181 secured to and extending laterally of supporting beams 128, 129, 130 and 131. It, therefore, is seen that the weights 179 acting on the levers 174 urge the sealing plates 165 into engagement with the undersides of the grate bars 39. The side flanges 166 lying in abutting relation with the side edges of skid plates 124, 125, 126 and 127 prevent air leakage therebetween. It is also seen that because of the overlapping relation of the ribs 167 and plates 162, the air in the chamber beneath the stoker is prevented from escaping therebetween. The sealing plate 162, transverse beam 132, sealing plate 158, skid ramp 152 and beams 150 and 151 also effectively seal the chamber beneath the stoker against air leakage. Inasmuch as the grate bars 39 completely occupy the space between skid ramp 152 and sealing plate 158, they in effect also form a seal against air leakage between the said ramp 152 and plate 158.

Referring more particularly to Figs. 10 to 18, each grate bar 39 comprises an elongated body portion 183 having a curved upper fuel supporting portion 184 and end walls 185 and 186. The curvature of body portion 183 at the top thereof is relatively gradual, as shown at 187, and becomes sharper as it approaches the bottom edge 188, as indicated at 189. The side walls 185 and 186 are provided with notches 185ª and 186ʰ, respectively, at the outer forwardly disposed sides thereof and with notches 185ᵇ and 186ᵇ at their inner rearwardly disposed sides. These notches in assembly permit the forward portions of side walls 185 and 186 of each grate bar 39 to overlap the rearwardly disposed portions of the side walls 185 and 186, respectively, of the next forward grate bar of the series, as shown more particularly in Figs. 10 and 11.

The front edge 191 of body portion 183 is provided with a series of slots or recesses 192 through which draft air may pass. The gradually curved portion 187 of each grate bar 39 also has a series of apertures 193 and 194 provided therein and arranged in staggered relation, as shown in Fig. 12. The front wall of each recess 192 is inclined, as shown at 195, so as to direct the air upwardly and rearwardly over the curved surface 187 of the next grate bar of the series to the rear thereof. The rear wall 196 of each of the apertures 194 is also inclined so as to direct the air upwardly and forwardly over the next grate bar in advance thereof. A cross flow of air, accordingly, results as shown by the arrows in Fig. 10, which not only intensifies the burning rate of the fuel supported on the grate but also distributes it over the entire area thereof. The apertures 193 disposed between the recesses 192 and apertures 194 direct the air more or less upwardly. As a result of the construction and arrangement of the air openings just described, draft air is directed over the entire area of the grate 6.

Each grate bar 39 has depending from the underside of the body portion 183 thereof two pairs of spaced ribs 197, 197 and 198, 198, having aligned open slots 199, 199 and 200, 200, respectively, provided therein for receiving supporting pins 201 and retaining sleeves 202.

As shown more particularly in Figs. 10, 12 and 13, the portion of the body portion 183 of each grate bar 39 disposed between the pairs of ribs 197, 197 and 198, 198 is cutaway so as to form substantially rectangular open recesses 203, 203 therebetween for receiving the operating chains 40. Reenforcing ribs 204, 205, 206, 207 and 208 extend respectively between side wall 185 and rib 197, ribs 197, 197, ribs 197 and 198, ribs 198, 198 and rib 198 and side wall 186. Rib 205 is cutaway, as shown at 209 and 210, and rib 207 is likewise cutaway, as shown at 211 and 212, to provide clearance for the links of the chains 40 as the grates pass around the sprocket wheels 41 and 42. The body portion 183 is also cutaway, as shown at 213 and 214, to accommodate the chains 40.

As shown more particularly in Figs. 10 and 11, chain 40 is of usual construction and consists of a series of links 215 connected by the pins 201. Each of the slots 200, 200 provided in ribs 198, 198 comprises an upper semicircular portion 216 having a radius substantially equal to that of a pin 201 and an enlarged portion 217 for receiving the locking sleeve 202. The slots 199 and 200 are open at the lower ends to permit entry of pins 201. The opposite ends of pins 201 extend beyond the outer sides of ribs 198, 198 and are provided with annular recesses 218 and 219 for receiving split spring locking rings 220 and 221, respectively. The slots 199, 199 provided in ribs 197, 197 are similar to the slots 200, 200 and also receive the pins 201 of the associated chain 40 and the locking sleeves 202.

To attach the grate bars 39 to the associated chains 40, the pins 201 are urged into the upper portions of the slots 199, 199 and 200, 200. The sleeves 202 are then inserted into the lower portions of the slots and snugly fit the undersides of the pins. The locking rings then are inserted in the annular recesses provided at the ends of the pins 201. The sleeves 202 are held against axial movement by the links 215 of chains 40 at one end thereof and by the locking rings at the other end. The grate bars 39 are thus pivotally supported on the pins 201.

Inasmuch as the pins 201 engage the grate bars 39 beneath the center lines thereof, the rear edges 191 of the said grate bars are urged into and maintained in contact with the curved upper surfaces of the next adjacent grate bars of the series, as shown in Figs. 1 and 10. The grate bars 39 remain in contact until they move past the skid ramp 152 when they swing about their pivots, as shown in Fig. 1. Any ashes clinging to the grate bars 39 thus are removed by gravity before they pass around the rear sprocket wheels 41.

In order to prevent separation of the grate bars 39 until they pass around a substantial portion of the front sprocket wheels 42, a series of shoes 223, 224, 225 and 226 are provided. As shown in Figs. 1 and 5, the shoes 223, 224, 225, and 226 are pivotally supported intermediate their ends to the upper ends of supporting arms 227, 228, 229 and 230, respectively, which arms in turn are secured at their lower ends to a transversely extending rod 231. Rod 231 is secured in any suitable manner against axial and rotary movement in brackets 232 secured to and extending forwardly of the web 157 of skid ramp 152. The inner faces 233 (Fig. 3) of shoes 223, 224, 225 and 226 are arcuate and conform with the curvature of the grate bars 39 as they pass around the front sprocket wheels 42. The shoes 223, 224, 225 and 226 are of sufficient length to extend around a group of grate bars 39. The middle shoes 224 and 225 engage the grate bars 39 of sections 36, 37 and 37, 38, respectively, near the adjacent ends thereof. The end shoes 223 and 226 prevent spreading of the outer ends of the grate bars 39 of sections 36 and 38. Inasmuch as the shoes 223, 224, 225 and 226 extend around a group of grate bars 39 and are pivoted intermediate their ends, they are self-adjusting and thus effectively retain the grate bars in contact while they pass around the front sprocket wheels 42, even though irregularities exist in the individual grate bars.

Referring more particularly to Fig. 4, it will be observed that the skid plates 124, 125, 126 and 127 have longitudinally extending recesses 235, 236, 237 and 238, respectively, provided therein. The upper surfaces of the skid plates 124, 125, 126 and 127 are smooth and support the lower edges 188 of the grate bars 39. The adjacent ends of the grate bars 39 of the sections 36, 37 and 38 are spaced slightly apart and overlie the recesses 236 and 237. Air from the chamber 49, accordingly, flows around the inner sides of end walls 185 and 186 of the grate bars 39 and into the recesses 236 and 237, respectively, and then through the spaces between the adjacent ends of the grate bars, as shown by the arrows in Fig. 14, to effect burning of the fuel lying between the grate sections.

The end walls 185 and 186, respectively, of the grate bars 39 of sections 36 and 38 are spaced slightly from the upper ends of side closing plates 240 and 241. Air from chamber 49, accordingly, flows over the upper surfaces of end skid plates 124 and 127 and around the inner surfaces of end walls 185 and 186 of the grate bars 39 of sections 36 and 38, respectively, and into recesses 235 and 238, and thence through the spaces between the ends of said grate bars and the side closing plates 240 and 241, respectively, as shown by the arrows in Fig. 4, to effect burning of the fuel lying in these regions of the fuel bed.

Owing to the overlapping arrangement of the grate bars 39 of each section, the air is compelled to flow either through the openings 192, 193 and 194 provided in the grate bars themselves or into the recesses 235, 236, 237 and 238 before escaping into the fuel bed between the ends of adjacent grate bars, or between the ends of the grate bars and the side closing plates 240 and 241, as just described. The ribs 197, 197 and 198, 198 of grate bars 39 are cutaway, as shown at 222 to permit the air to circulate over the length of the grate bars between end walls 185 and 186.

From the foregoing description it is seen that a simplified and highly improved stoker has been provided. The rotors 13 and 14 propel the fuel through the openings 20 provided in the front wall 2 of the furnace and spread it over the grate 6, as shown by dotted lines in Fig. 3. As previously pointed out, a large portion of the fuel is burned in suspension, while the remainder is burned on the grate as it is moved from rear to front of the furnace by the operating mechanism, indicated at 47. Air for combustion is admitted to the fuel bed through the openings 192, 193 and 194 of the grate bars 39 and through the clearance spaces between the adjacent ends of the grate bars and between the ends of the grate bars and the side closing plates 240 and 241, as previously described. The front and rear sealing plates 165 and 138 prevent the draft air from passing through the grate bars 39 beyond the inner edges of said sealing plates.

Air leakage from the chamber 49 beneath the stoker is prevented at the rear thereof by closing plate 134, curved plate 135, sealing plates 146 and packing material 147, at the sides by side closing plates 240 and 241; and at the front by supporting beams 150 and 151, the skid ramp 152, the grate bars 39, the sealing plate 158; the front supporting beam 132 and sealing plates 162 and 165.

The shoes 223, 224, 225 and 226 may engage the grate bars 39 intermediate the ends of the latter, if it is so desired. The structure of the sealing plates, grate bars and operating mechanism may also be varied to best suit the operating conditions of a particular installation without departing from the invention.

Accordingly, while the embodiment of the invention herein shown and described, is admirably adapted to fulfill the objects primarily stated, it is to be understood that it is not intended to limit the invention thereto since it may be embodied in other forms, all coming within the scope of the claims which follow.

What is claimed is:

1. A furnace stoker comprising a flexible endless traveling grate consisting of an upper fuel supporting run and a lower return run, said grate comprising a series of substantially parallel grate bars disposed in overlapping relation, operating chains for said grate, means for pivotally attaching the said grate bars to said chains, a shaft rotatably mounted adjacent the front end of said grate, a second shaft mounted adjacent the rearwardly disposed end of said grate, sprockets for said chains secured to said shafts, means for operating one of said shafts to effect a movement of the upper run of said grate from rear to front of said stoker, and means for retaining the said grate bars in contact with adjacent grate bars as they pass around the sprockets on said front shaft, said last mentioned means comprising one or more shoes, a transverse support, a standard for each of said shoes, means for securing said standards to said transverse support, and means for pivotally connecting said shoes to said standards.

2. A furnace stoker comprising a plurality of flexible endless traveling grates disposed in side by side relation, each of said grates consisting of an upper fuel supporting run and a lower return run, each of said grates comprising a series of substantially parallel grate bars disposed in overlapping relation, operating chains for said grates, means for pivotally attaching the said grate bars to said chains, a shaft rotatably mounted adjacent the front end of said grates, a second shaft rotatably mounted adjacent the rearwardly disposed end of said grates, sprockets for said chains secured to said shafts, means for operating one of said shafts to effect a movement of the upper runs of said grates from rear to front of said stoker, and means for retaining said grate bars in contact with adjacent grate bars as they pass around the sprockets on said front shaft; said last mentioned means comprising a series of arcuate shoes, at least one for engaging the grate bars of each of said grates, a non-rotatable rod, a supporting arm for each of said shoes, means for securing said arms to said rod, and means for pivotally supporting said shoes on said arms at points intermediate the ends of said shoes.

3. A furnace stoker comprising a flexible endless traveling grate, said grate consisting of a series of substantially parallel grate bars disposed in overlapping relation, connecting means for said grate bars, means for pivotally connecting said grate bars to said connecting means, rotatable means for operating said grate, and means disposed adjacent said rotatable means for retaining said grate bars in contact with each other as they pass around said rotatable means; said last mentioned means comprising one or more arcuate shoes, supporting means, and means for pivotally connecting said arcuate shoes intermediate the ends thereof to said supporting means.

ERNST L. MIDGETTE.
JUNE E. BECK.

REFERENCES CITED

The following references are of record in the file of this patent:

UNITED STATES PATENTS

| Number | Name | Date |
|---|---|---|
| 510,549 | Richards | Dec. 12, 1893 |
| 536,394 | Richards | Mar. 26, 1895 |
| 547,244 | Crowe | Oct. 1, 1895 |
| 974,902 | Merrill | Nov. 8, 1910 |
| 1,010,758 | Hedden | Dec. 5, 1911 |
| 1,368,172 | Lloyd | Feb. 8, 1921 |
| 1,388,714 | Hofmann | Aug. 23, 1921 |
| 1,437,931 | Courtney et al. | Dec. 5, 1922 |
| 1,476,276 | Witz | Dec. 4, 1923 |
| 1,477,896 | Poppenhusen et al. | Dec. 18, 1923 |
| 1,627,715 | Stowe | May 10, 1927 |
| 1,832,888 | Zinkernagel | Nov. 24, 1931 |
| 1,897,112 | Courtney | Feb. 14, 1933 |
| 1,917,652 | Krieger | July 11, 1933 |
| 2,271,967 | Beers | Feb. 3, 1942 |
| 2,294,441 | Beers | Sept. 1, 1942 |
| 2,302,173 | Beers | Nov. 17, 1942 |
| 2,356,144 | Beers | Aug. 22, 1944 |
| 2,363,932 | Beers | Nov. 28, 1944 |

FOREIGN PATENTS

| Number | Country | Date |
|---|---|---|
| 677,863 | Germany | July 4, 1939 |